Figure 1:
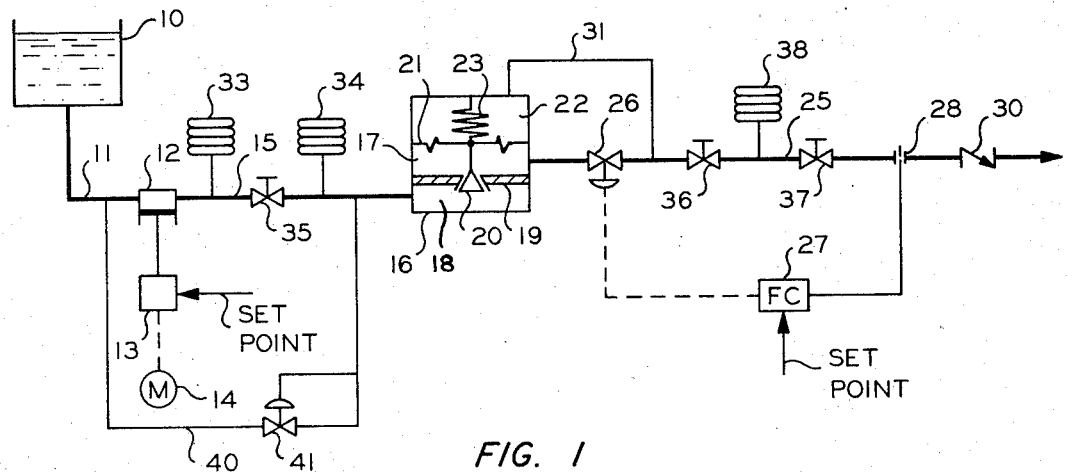

United States Patent

[11] 3,543,784

| [72] | Inventor | Dexter E. Smith<br>Bartlesville, Oklahoma |
|---|---|---|
| [21] | Appl. No. | 675,204 |
| [22] | Filed | Oct. 13, 1967 |
| [45] | Patented | Dec. 1, 1970 |
| [73] | Assignee | Phillip Petroleum Company<br>a corporation of Delaware |

[54] FLOW CONTROL SYSTEM
5 Claims, 3 Drawing Figs.

[52] U.S. Cl. .................................................. 137/116,
137/8, 137/568, 137/88, 137/487
[51] Int. Cl. ..................................................... G05d 16/02
[50] Field of Search .......................................... 137/37, 88,
108, 486, 487, 220, 488, 489, 490, 501, 8, 568

[56] References Cited
UNITED STATES PATENTS

| 2,255,787 | 9/1941 | Kendrick ..................... | 137/568 |
| 2,787,285 | 4/1957 | Spence ........................ | 137/486 |
| 3,017,922 | 1/1962 | Peterson ...................... | 137/568 |
| 3,361,146 | 1/1968 | Patterson .................... | 137/8 |

*Primary Examiner*—William F. O'Dea
*Assistant Examiner*—William H. Wright
*Attorney*—Young and Quigg ABSTRACT: A flow control system employs a first flow controller which regulates a valve downstream from a pump. A pressure responsive controller senses pressure downstream from the valve and regulates flow between the pump and valve. Pump regulation means responsive to pressure downstream of the pump can be employed, as can pressure responsive bypass flow means around the pump. Flow smoothing means can be added upstream and downstream from the pressure responsive controller.

Patented Dec. 1, 1970    3,543,784

INVENTOR.
D. E. SMITH
BY Young & Quigg
ATTORNEYS

FLOW CONTROL SYSTEM

This invention relates to the transmission of fluids at constant flow rates.

In various industrial operations there is a need for apparatus which is capable of introducing fluid streams into process units at constant rates. It is often difficult to provide apparatus capable of meeting these requirements, particularly when a fluid stream is delivered at a relatively low flow rate. While positive displacement pumps are capable of transmitting fluid at general uniform rates, it is often difficult to measure the exact flow rate, because of the pulsating pressure generated, and to provide uniform flow rates. Although various types of flow control devices have been used in connection with positive displacement pumps, these systems have not always been satisfactory when extremely accurate flows are required.

In accordance with the present invention, a system is provided which is capable of delivering fluids at uniform rates. This is accomplished by the combination of a conventional flow controller with a pressure responsive flow controller. The conventional flow controller adjusts a motor valve in the delivery conduit in response to a measurement of the rate of flow through the conduit. A pressure responsive flow controller is positioned in the conduit upstream from the motor valve. The pressure sensing point of this latter controller is connected to the conduit downstream from the motor valve so that the pressure sensitive flow controller reduces pressure fluctuations to the input of the motor valve, thereby increasing the accuracy of the flow control system. In another embodiment of this invention, a conduit having a pressure control valve therein is connected around the pumping means to smooth the rate of flow. In still another embodiment, the speed of the pumping means is adjusted in response to a measurement of the pressure downstream therefrom. Suitable flow restrictors and reservoir means can also be added to the system to provide more uniform flows.

Accordingly, it is an object of this invention to provide a fluid transmission system which is capable of delivering fluids at constant flow rates.

Another object is to provide a control system for use in conjunction with a pumping means to provide flows at constant rates.

Figure 2:
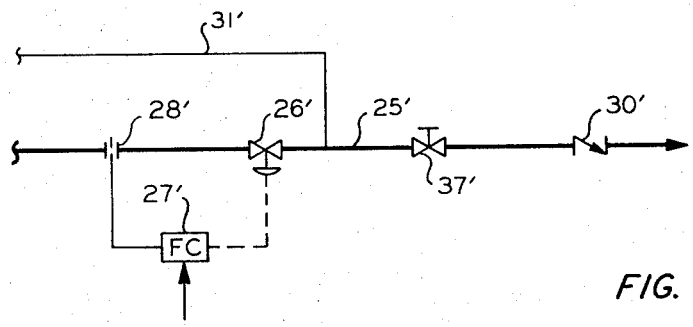
Figure 3:
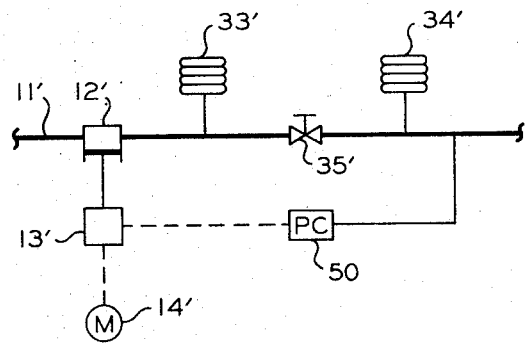

Other objects, advantages and features of the invention should become apparent from the following detailed description, taken in conjunction with the accompanying drawing in which:

FIG. 1 is a schematic representation of a first embodiment of the flow control system of this invention. FIG. 2 illustrates a modified portion of the apparatus of FIG. 1. FIG. 3 illustrates a second modified portion of the apparatus of FIG. 1.

Referring now to the drawing in detail and to FIG. 1 in particular, there is shown a tank 10 which contains a liquid that is to be transmitted at a uniform rate. An outlet conduit 11 extends from tank 10 to the inlet of a pump 12, which preferably is a positive displacement pump. An adjustable pump stroke or other speed control mechanism 13 is connected between pump 12 and a driving motor 14 to permit the rate of flow to be varied. This adjustment is accomplished by manipulating a suitable set point in the mechanism. A conduit 15 extends from the outlet of pump 12 to the inlet of a pressure sensitive flow controller 16.

As illustrated schematically in FIG. 1, controller 16 is divided into two chambers 17 and 18 by a plate 19 which has an opening therein. A valve head 20 is positioned for movement within the valve assembly to adjust the opening between chambers 17 and 18. Valve head 20 is connected to a movable diaphragm 21 which separates chamber 17 from an upper chamber 22. A spring 23 is positioned within chamber 22 to exert a downward force on diaphragm 21 to increase the size of the opening between chambers 17 and 18. An outlet conduit 25 is connected to chamber 17 to deliver fluid to a suitable process unit, not shown.

A motor control valve 26 is disposed in conduit 25. A flow controller 27 receives an input signal which is representative of the rate of flow through conduit 25, and provides an output control signal to adjust motor valve 26 to tend to maintain the measured flow constant. The input signal to flow controller 27 can be provided by an orifice transmitter 28 which measures the differential pressure across an orifice in conduit 25. However, other types of flow sensing means can be employed if desired. A check valve 30 is normally provided in outlet conduit 25 to prevent any back flow into the system. A conduit 31 is connected between chamber 22 of flow controller 16 and conduit 25 at a point downstream from motor valve 26 so that controller 16 operates to maintain a constant pressure drop across valve 26. This results in more uniform flow control throughout the system.

If desired, additional flow equalizing devices can be utilized in the system to provide more uniform flow rates. For example, flow reservoirs 33 and 34 can be connected to conduit 11 between pump 12 and flow controller 16. These reservoirs can be bellows, bourdon tubes, or any other device which is capable of receiving excess surges of fluid and returning the fluid to the system when the pressure decreases. A flow restrictor 35 can be connected in conduit 11 between reservoir means 33 and 34. This restrictor can be an orifice, a needle valve or even a length of conduit offering the desired flow resistance. It should be evident that the restrictors and reservoirs function to smooth the flow in a manner analogous to filters formed by resistors and capacitors in an electrical circuit. Similarly, restrictor means 36 and 37 can be positioned in conduit 25 downstream from valve 26, and a reservoir 38 can be connected to conduit 25 between restrictors 36 and 37.

An additional feature of this invention involves a conduit 40 which is connected at one end to conduit 11 between reservoir 34 and flow controller 16 and at the other end to conduit 11 upstream from pump 12. A back pressure control valve 41 is positioned in conduit 40. Conduit 40 and pressure control valve 41 serve to bypass a portion of the output of the pump back to the inlet to provide more uniform pressure at the inlet of flow controller 16.

Flow controller 27 normally adjusts valve 26 so that fluid is delivered through conduit 25 at a uniform rate. In addition, flow controller 16 adjusts the rate of flow to the inlet of valve 26 in response to the pressure downstream of the valve so as to provide a more uniform rate of flow into the flow control system of valve 26 and controller 27. A constant pressure differential is maintained between the fluid in chamber 17 and in conduit 31, this difference being proportional to the force of spring 23. A constant pressure differential thus appears across valve 26. This greatly increases the accuracy of the entire flow control system.

A second embodiment of this invention is illustrated in FIG. 2 wherein corresponding elements are designated by like primed reference numerals. In FIG. 2, the input to flow controller 27' is measured by a sensing device 28' which is positioned upstream from valve 26'. Otherwise, the system is generally the same as that described above. Although a flow restrictor and fluid reservoir corresponding to 36 and 38 are not illustrated in FIG. 2, they can be added if greater accuracy is required.

An alternate embodiment of the pump control system is illustrated schematically in FIG. 3. In this embodiment, the pump speed control mechanism 13' is adjusted by the output of a pressure controller 50 which senses the pressure in conduit 11' downstream from fluid reservoir 34'. If the measured pressure tends to increase, controller 50 reduces the stroke length of pump 12', or otherwise decreases the pumping rate. Conversely, a decrease in measured pressure results in an increase in the pumping rate. This system is employed as an alternative to the pump bypass system of FIG. 1. Both systems tend to provide uniform pressure at the inlet of controller 16.

While the invention has been described in conjunction with presently preferred embodiments, it obviously is not limited thereto.

I claim:
1. Fluid transmission apparatus comprising:
    conduit means adapted to communicate at one end with a source of fluid and to deliver fluid from the second end;

pumping means disposed in said conduit means;
a flow controller disposed in said conduit means downstream from said pumping means, said flow controller being responsive to the pressure at a first point in said conduit means downstream from said flow controller;
a valve in said conduit means at a second point between said flow controller and said first point;
flow control means to sense the rate of flow through said conduit means downstream of said flow controller and to adjust said valve in response thereto;
fluid flow restriction means disposed in said conduit means between said pumping means and said flow controller;
fluid reservoir means connected to said conduit means between said pumping means and said flow controller; and
pressure sensing means connected to said conduit means at a point downstream from said flow restriction means and said reservoir means, said pressure sensing means adjusting said pumping means in response to the measured pressure.

2. Fluid transmission apparatus comprising:
conduit means adapted to communicate at one end with a source of fluid and to deliver fluid from the second end;
pumping means disposed in said conduit means;
a flow controller disposed in said conduit means downstream from said pumping means, said flow controller being responsive to the pressure at a first point is said conduit means downstream from said flow controller;
a valve in said conduit means at a second point between said flow controller and said first point;
fluid flow restriction means disposed in said conduit means downstream from said valve;
fluid reservoir means communicating with said conduit means downstream from said valve; and
flow control means to sense the rate of flow through said conduit means downstream of said restriction means and said reservoir means and to adjust said valve in response thereto.

3. Fluid transmission apparatus comprising:
conduit means adapted to communicate at one end with a source of fluid and to deliver fluid from the second end;
pumping means disposed in said conduit means;
a flow controller disposed in said conduit means downstream from said pumping means, said flow controller being responsive to the pressure at a first point in said conduit means downstream from said flow controller;
a valve in said conduit means at a second point between said flow controller and said first point; and
flow control means to sense the rate of flow through said conduit means at a point between said flow controller and said valve and to adjust said valve in response thereto.

4. The apparatus of claim 2, further comprising second conduit means communicating at one end with the first mentioned conduit means at a point downstream from said flow restriction means and said reservoir means and at the second end with the first mentioned conduit means upstream from said pumping means, and pressure regulating means disposed in said second conduit means.

5. The apparatus of claim 2, further comprising second fluid flow restriction means disposed in said conduit means downstream from said valve, and second fluid reservoir means communicating with said conduit means downstream from said valve.